United States Patent
Wang

(10) Patent No.: US 12,439,104 B2
(45) Date of Patent: Oct. 7, 2025

(54) STREAMING MEDIA TRANSMISSION METHOD AND APPARATUS

(71) Applicant: Huawei Cloud Computing Technologies Co., Ltd., Guizhou (CN)

(72) Inventor: Nannan Wang, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 74 days.

(21) Appl. No.: 18/455,386

(22) Filed: Aug. 24, 2023

(65) Prior Publication Data

US 2023/0412873 A1 Dec. 21, 2023

Related U.S. Application Data

(63) Continuation of application No. PCT/CN2021/118138, filed on Sep. 14, 2021.

(30) Foreign Application Priority Data

Feb. 25, 2021 (CN) .......................... 202110211834.7

(51) Int. Cl.
*H04N 21/2343* (2011.01)
*H04N 19/30* (2014.01)
*H04N 21/633* (2011.01)

(52) U.S. Cl.
CPC ..... *H04N 21/234327* (2013.01); *H04N 19/30* (2014.11); *H04N 21/633* (2013.01)

(58) Field of Classification Search
CPC ......... H04N 21/234327; H04N 21/633; H04N 19/30
USPC ........................................................ 725/146
See application file for complete search history.

(56) References Cited

U.S. PATENT DOCUMENTS

| | | | |
|---|---|---|---|
| 2011/0128923 A1 | 6/2011 | Cilli et al. | |
| 2018/0103013 A1* | 4/2018 | Imai | H04L 63/061 |
| 2019/0028743 A1* | 1/2019 | He | H04N 21/2225 |
| 2020/0404538 A1* | 12/2020 | Zhu | H04L 67/06 |
| 2021/0105338 A1* | 4/2021 | Oyman | H04L 67/61 |
| 2023/0040580 A1* | 2/2023 | Yuan | H04W 76/11 |

* cited by examiner

*Primary Examiner* — Benjamin R Bruckart
*Assistant Examiner* — Alexander Boyd
(74) *Attorney, Agent, or Firm* — Conley Rose, P.C.

(57) ABSTRACT

In a streaming media transmission method, a streaming media server receives a first message sent by a terminal device. The first message includes a streaming media identifier, and the first message is used to request streaming media corresponding to the streaming media identifier. The streaming media server processes the streaming media based on scalable video coding SVC to obtain at least one data stream. The streaming media server determines quality of service QoS for each data stream. The streaming media server sends a second message to a first edge streaming media server. The second message includes the QoS of each of the at least one data stream, and the second message indicates the first edge streaming media server to transmit the at least one data stream to the terminal device by using a resource corresponding to the QoS of each data stream.

20 Claims, 7 Drawing Sheets

STREAMING MEDIA TRANSMISSION METHOD AND APPARATUS

CROSS-REFERENCE TO RELATED APPLICATIONS

This is a continuation of Int'l Patent App. No. PCT/CN2021/118138, filed on Sep. 14, 2021, which claims priority to Chinese Patent App. No. 202110211834.7, filed on Feb. 25, 2021, both of which are incorporated by reference.

FIELD

This disclosure relates to the field of communication technologies, and in particular, to a streaming media transmission method and an apparatus.

BACKGROUND

A scalable video coding (SVC) technology is a technology that can perform layered encoding/decoding to divide a video stream into a plurality of video streams with different resolutions, quality, and frame rates. The SVC technology can divide a video stream into a base layer and a plurality of enhancement layers, and put data streams of different layers to different data packets on a network for transmission.

Quality of service (QoS) of cloud media is related to a content source, a resolution, a frame rate, a scenario, and the like. When SVC is used to encode and decode the cloud media, generated streaming media has an extremely complex QoS requirement. However, in an existing technology, no related solution is provided to resolve a problem of how to ensure transmission quality of the streaming media having an extremely complex QoS requirement.

SUMMARY

Embodiments provide a streaming media transmission method and an apparatus, to ensure transmission quality of streaming media having an extremely complex QoS requirement.

According to a first aspect, a streaming media transmission method is provided, including: A streaming media server receives a first message sent by a terminal device. The first message includes a streaming media identifier, and the first message is used to request streaming media corresponding to the streaming media identifier. The streaming media server processes the streaming media based on scalable video coding SVC to obtain at least one data stream. The streaming media server determines quality of service QoS for each data stream. The streaming media server sends a second message to a first edge streaming media server. The second message includes the QoS of each of the at least one data stream, and the second message indicates the first edge streaming media server to transmit the at least one data stream to the terminal device by using a resource corresponding to the QoS of each data stream.

Based on the foregoing technical solution, the streaming media server processes, by using the SVC technology, the streaming media requested by the terminal, to obtain the at least one data stream, and determines the QoS for each data stream, so that the edge streaming media server may transmit the at least one data stream to the terminal device by using the resource corresponding to the QoS of each data stream. Based on the SVC technology, multi-stream transmission is implemented, and the edge streaming media server pushes the streaming media based on different requirements, thereby ensuring transmission quality of the streaming media.

In a possible design, the resource corresponding to the QoS is a fifth-generation (5G) network slice resource.

In a possible design, that the streaming media server determines QoS for each data stream includes: The streaming media server determines corresponding QoS for each data stream based on a preset mapping relationship. The preset mapping relationship is preconfigured by a streaming media provider. Based on this design, the corresponding QoS is determined for each data stream based on the preset mapping relationship, so that during subsequent data stream transmission, the data stream may be transmitted based on the resource corresponding to the QoS, thereby ensuring transmission quality of the streaming media.

In a possible design, the first message further includes an identifier of the terminal device, and before the streaming media server sends the second message to the first edge streaming media server, the method further includes: The streaming media server sends a third message to a network device. The third message is used to request to bind the identifier of the terminal device to the resource corresponding to the QoS. The streaming media server receives a fourth message sent by the network device. The fourth message indicates a result of binding the identifier of the terminal device to the resource corresponding to the QoS.

In a possible design, if the streaming media server determines, based on the fourth message, that the identifier of the terminal device is successfully bound to the resource corresponding to the QoS, the second message further includes a stream identifier of the at least one data stream and a mapping relationship between a stream identifier of each data stream and the QoS of each data stream. The method further includes: The streaming media server transmits the at least one data stream to the first edge streaming media server.

In a possible design, the method further includes: The streaming media server processes other streaming media based on SVC to obtain at least one another data stream. The other streaming media is streaming media requested by another terminal device. The at least one another data stream includes a first data stream and at least one second data stream, the first data stream represents a data stream of basic quality, and a data stream formed by the at least one second data stream and the first data stream has higher quality than the data stream of basic quality. The streaming media server determines QoS for each of the at least one another data stream. The streaming media server transmits the first data stream to the first edge streaming media server if the streaming media server determines that an identifier of the another terminal device is unsuccessfully bound to a resource corresponding to QoS of the at least one another data stream.

In a possible design, the method further includes: The streaming media server receives a fifth message sent by the first edge streaming media server. The fifth message includes a priority of the streaming media and/or a priority of the at least one data stream. The streaming media server controls, based on the fifth message, the first edge streaming media server to transmit the at least one data stream to the terminal device.

In a possible design, that the streaming media server controls, based on the fifth message, the first edge streaming media server to transmit the at least one data stream to the terminal device includes: The streaming media server determines, based on the fifth message, to break a connection through which the first edge streaming media server transmits a third data stream to the terminal device. The third data stream belongs to the at least one data stream.

In a possible design, after the streaming media server determines, based on the fifth message, to break the connection through which the first edge streaming media server transmits the third data stream to the terminal device, the method further includes: The streaming media server sends a sixth message to a second edge streaming media server. The sixth message includes a stream identifier of the third data stream, and the sixth message indicates the second edge streaming media server to transmit the third data stream to the terminal device.

According to a second aspect, a streaming media transmission method is provided, including: A first edge streaming media server receives a second message sent by a streaming media server. The second message includes QoS of each of at least one data stream, and the second message indicates the first edge streaming media server to transmit the at least one data stream to a terminal device by using a resource corresponding to the QoS of each data stream. The at least one data stream is obtained by the streaming media server by processing streaming media based on SVC. The first edge streaming media server transmits the at least one data stream to the terminal device based on the second message.

Based on the foregoing technical solution, the first edge streaming media server receives the second message from the streaming media server, the second message includes the QoS of each of the at least one data stream, and the first edge streaming media server may transmit, based on an indication of the second message, the at least one data stream to the terminal device by using the resource corresponding to the QoS of each data stream. Based on the SVC technology, multi-stream transmission is implemented, and the edge streaming media server pushes media streams based on different requirements, thereby ensuring transmission quality of the streaming media.

In a possible design, the resource corresponding to the QoS is a 5G network slice resource.

In a possible design, a preset mapping relationship exists between a stream identifier of the data stream and the QoS, and the preset mapping relationship is preconfigured by a streaming media provider.

In a possible design, the second message further includes a stream identifier of the at least one data stream. Before the first edge streaming media server transmits the at least one data stream to the terminal device, the method further includes: The first edge streaming media server obtains the at least one data stream from the streaming media server based on the second message. The first edge streaming media server establishes at least one connection by using the resource corresponding to the QoS. The at least one connection is used to transmit the at least one data stream.

In a possible design, after the first edge streaming media server transmits the at least one data stream to the terminal device, the method further includes: The first edge streaming media server obtains a fifth message. The fifth message includes a priority of the streaming media and/or a priority of the at least one data stream. The first edge streaming media server controls the at least one connection based on the fifth message.

In a possible design, the method further includes: The first edge streaming media server sends the fifth message to the streaming media server. The fifth message indicates the streaming media server to control the at least one connection.

According to a third aspect, a streaming media server is provided, and includes a processing module and a communication module connected to the processing module. The communication module is configured to receive a first message sent by a terminal device. The first message includes a streaming media identifier, and the first message is used to request streaming media corresponding to the streaming media identifier. The processing module is configured to process the streaming media based on scalable video coding SVC to obtain at least one data stream. The processing module is further configured to determine quality of service QoS for each data stream. The communication module is further configured to send a second message to a first edge streaming media server. The second message includes the QoS of each of the at least one data stream, and the second message indicates the first edge streaming media server to transmit the at least one data stream to the terminal device by using a resource corresponding to the QoS of each data stream.

In a possible design, the resource corresponding to the QoS is a 5G network slice resource.

In a possible design, the processing module is further configured to determine corresponding QoS for each data stream based on a preset mapping relationship. The preset mapping relationship is preconfigured by a streaming media provider.

In a possible design, the first message further includes an identifier of the terminal device. The communication module is further configured to send a third message to a network device. The third message is used to request to bind the identifier of the terminal device to the resource corresponding to the QoS. The communication module is further configured to receive a fourth message sent by the network device. The fourth message indicates a result of binding the identifier of the terminal device to the resource corresponding to the QoS.

In a possible design, the processing module is further configured to determine, based on the fourth message, that the identifier of the terminal device is successfully bound to the resource corresponding to the QoS. In this case, the second message further includes a stream identifier of the at least one data stream and a mapping relationship between a stream identifier of each data stream and the QoS of each data stream. The communication module is further configured to transmit the at least one data stream to the first edge streaming media server.

In a possible design, the processing module is further configured to process other streaming media based on SVC to obtain at least one another data stream. The other streaming media is streaming media requested by another terminal device. The at least one another data stream includes a first data stream and at least one second data stream, the first data stream represents a data stream of basic quality, and a data stream formed by the at least one second data stream and the first data stream has higher quality than the data stream of basic quality. The processing module is further configured to determine QoS for each of the at least one another data stream. The processing module is further configured to determine that an identifier of the another terminal device is unsuccessfully bound to a resource corresponding to QoS of the at least one another data stream. The communication module is further configured to transmit the first data stream to the first edge streaming media server.

In a possible design, the communication module is further configured to receive a fifth message sent by the first edge streaming media server. The fifth message includes a priority of the streaming media and/or a priority of the at least one data stream. The processing module is further configured to control, based on the fifth message, the first edge streaming media server to transmit the at least one data stream to the terminal device.

In a possible design, the processing module is further configured to determine, based on the fifth message, to break a connection through which the first edge streaming media server transmits a third data stream to the terminal device. The third data stream belongs to the at least one data stream.

In a possible design, the communication module is further configured to send a sixth message to a second edge streaming media server. The sixth message includes a stream identifier of the third data stream, and the sixth message indicates the second edge streaming media server to transmit the third data stream to the terminal device.

According to a fourth aspect, an edge streaming media server is provided, including a communication module. The communication module is configured to receive a second message sent by a streaming media server. The second message includes QoS of each of at least one data stream, and the second message indicates the edge streaming media server to transmit the at least one data stream to a terminal device by using a resource corresponding to the QoS of each data stream. The at least one data stream is obtained by the streaming media server by processing streaming media based on SVC. The communication module is further configured to transmit the at least one data stream to the terminal device based on the second message.

In a possible design, the resource corresponding to the QoS is a 5G network slice resource.

In a possible design, a preset mapping relationship exists between a stream identifier of the data stream and the QoS, and the preset mapping relationship is preconfigured by a streaming media provider.

In a possible design, the second message further includes a stream identifier of the at least one data stream. The edge streaming media server further includes a processing module connected to the communication module. The communication module is further configured to obtain the at least one data stream from the streaming media server based on the second message. The processing module is configured to establish at least one connection by using the resource corresponding to the QoS. The at least one connection is used to transmit the at least one data stream.

In a possible design, the communication module is further configured to obtain a fifth message. The fifth message includes a priority of the streaming media and/or a priority of the at least one data stream. The processing module is further configured to control the at least one connection based on the fifth message.

In a possible design, the communication module is further configured to send the fifth message to the streaming media server. The fifth message indicates the streaming media server to control the at least one connection.

According to a fifth aspect, a streaming media server is provided, including a processor. The processor is configured to couple to a memory, read instructions in the memory, and implement the method in the first aspect according to the instructions.

According to a sixth aspect, an edge streaming media server is provided, including a processor. The processor is configured to couple to a memory, read instructions in the memory, and implement the method in the second aspect according to the instructions.

According to a seventh aspect, a computer-readable storage medium is provided. The computer-readable storage medium stores computer instructions, and when the computer instructions are run on a computer, the computer is enabled to perform the method according to any one of the first aspect and the second aspect or the designs of the first aspect and the second aspect.

According to an eighth aspect, a computer program product including computer instructions is provided. When the computer instructions are run on a computer, the computer is enabled to perform the method according to any design of the first aspect or the second aspect.

According to a ninth aspect, a computer device is provided, including a communication interface, a processor, and a memory. The communication interface is configured to communicate with another device, the memory stores instructions, and the processor is configured to execute the instructions stored in the memory, to enable the computer device to perform the method according to any design of the first aspect or the second aspect.

According to a tenth aspect, a communication system is provided, including the streaming media server provided in any one of the third aspect or the designs of the third aspect, and the edge streaming media server provided in any one of the fourth aspect or the designs of the fourth aspect.

It should be noted that, for technical effects brought by any design of the third aspect to the tenth aspect, refer to technical effects brought by a corresponding design in the first aspect or the second aspect. Details are not described herein again.

DETAILED DESCRIPTION

Figure 1:
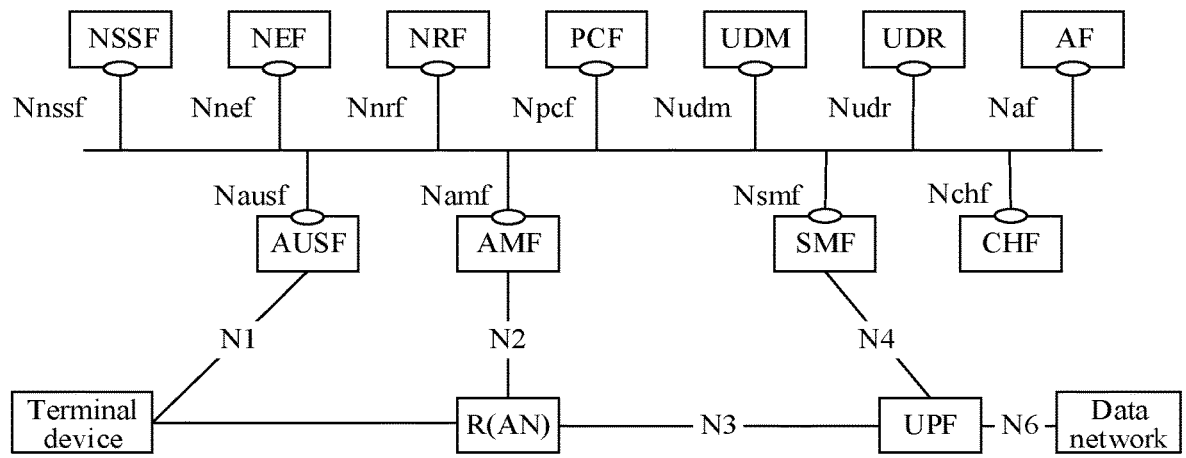
FIG. 1 is a schematic diagram of a service-oriented architecture of an existing 5G network.

Unless otherwise specified, "I" means "or". For example, A/B may indicate A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. The words such as "first" and "second" do not limit a quantity or an execution sequence, nor indicate a definite difference.

"Example" or "for example" represent giving an example, an illustration, or a description. Any embodiment or design scheme described as an "example" or "for example" should not be explained as being more preferred or having more advantages than another embodiment or design scheme. Exactly, use of the word such as "example" or "for example" is intended to present a relative concept in a specific manner.

The following describes terms in embodiments to help a person skilled in the art to have a better understanding.

1. SVC

An SVC technology is a technology that can divide a video stream into a plurality of video streams with different resolutions, quality, and frame rates. As encoded by using the SVC technology, a video stream may be divided into two or more different streams, which are referred to as layers. These layers include a base layer and a plurality of enhancement layers. The base layer includes the most basic and important information in the video stream, and the enhancement layers include detailed information in the video stream. These layers are respectively put to different data packets on a network for transmission. A receiving end can perform decoding and create a video image of basic quality provided that the base layer is accurately received. In addition, the receiving end can decode the received complete base layer and enhancement layers together, to create a video image of higher quality.

Impact caused by loss of a base layer data packet is the same as that of a non-layered encoding result, while impact caused by loss of an enhancement layer data packet is much smaller. Because the enhancement layer is based on the base layer rather than a previous frame image, the loss of the enhancement layer data packet causes only temporary definition and frame rate decreases, and does not affect a basic architecture of the video image.

The SVC technology has the following advantages:
(1) A decoder may choose, based on network conditions and device capabilities, to decode different layers of streams.
(2) Encoding is performed once, decoding may be performed a plurality of times, and there is no need of repeated encoding or transcoding.
(3) Error resilience is implemented as decoding can be performed only with an underlying stream and an error or loss of higher-layer streams does not affect video fluency. Packet loss concealment/error resilience methods with different intensities may be used for the underlying stream and the higher-layer streams. With forward error correction (FEC), an overall stream bandwidth of SVC may be lower.
(4) The underlying stream is compatible with an H.264 non-SVC decoder.

SVC supports three layering methods:
(1) Temporal scalability: Streams with different frame frequencies can be extracted from a stream.
(2) Spatial scalability: Streams with different image sizes can be extracted from a stream.
(3) Quality scalability: Streams with different image quality can be extracted from a stream.

2. QoS

QoS is a security mechanism of a network, and is a technology used to resolve problems such as a network delay and congestion. In normal cases, if the network is applied to a specific application system without a time limit, for example, Web application or e-mail settings, QoS is not required. However, a QoS guarantee is important to a network with a limited capacity, especially for streaming media applications, such as voice over Internet Protocol (VoIP) and Internet Protocol television (IPTV). These services have high requirements on real-time performance, transmission accuracy, and user experience. Therefore, it may be necessary for a bearer network of these services to provide an end-to-end QoS guarantee.

QoS mainly includes four indicators: a bandwidth, a delay, a jitter, and a packet loss rate. These QoS indicators are mostly applied to a relatively low protocol layer and are not directly observed or perceived by applications.

Currently, conventional QoS provides the following service models:
(1) Best effort service model: A network tries its best to send a packet, but does not provide any guarantee for performance such as a delay and reliability.
(2) Integrated service (Int-Serv) model: This model can meet a plurality of QoS requirements. A Resource Reservation Protocol (RSVP) is used to run this model on each device from a source end to a destination end, to monitor each stream and prevent the stream from consuming excessive resources. This model can clearly differentiate and guarantee quality of service of each service stream, and provide the most fine-grained quality of service differentiation for a network.
(3) Differentiated service (Diff-Serv) model: This model can meet different QoS requirements without notifying a network to reserve resources for each service.

A 5G QoS model is based on QoS flows. The 5G QoS model supports a guaranteed bit rate (GBR) QoS flow and a non-guaranteed bit rate (non-GBR) QoS flow. Whether a QoS flow is a GBR QoS flow or a non-GBR QoS flow is determined by a corresponding QoS profile. A QoS profile may include the following parameters: a 5G QoS identifier (5QI), an allocation and retention priority (ARP), a guaranteed flow bit rate (GFBR), and a maximum flow bit rate (MFBR), and optionally includes QoS notification control (QNC). Specifically, the 5QI is a scalar, and is used to retrieve a corresponding 5G QoS characteristic. The 5QI includes a standardized 5QI, a preconfigured 5QI, and a dynamically allocated 5QI. Standardized 5QIs are in a one-to-one correspondence with a group of standardized 5G QoS characteristic values. A 5G QoS characteristic value corresponding to the preconfigured 5QI is preconfigured on a radio access network (RAN) device. A 5G QoS characteristic corresponding to the dynamically allocated 5QI is sent by a core network device to a RAN device by using a QoS profile. Therefore, different 5QIs have different QoS levels, and different QoS levels correspond to different 5G QoS characteristics (delays and packet loss rates).

3. 5G Network Slice

The 5G network slice means to slice a physical network into a plurality of virtual end-to-end networks. The virtual networks, including devices, access, transmission, and core networks in the networks, are logically independent of each other, and a fault occurring in any virtual network does not affect any other virtual network. The virtual networks have different functional features to meet differentiated service requirements on a user quantity, QoS, a bandwidth, and a delay, and adapt to various service scenarios and applications.

A network slice includes at least a radio sub-slice, a bearer sub-slice, and a core network sub-slice. 5G network slices are logically independent of each other but share physical resources. Therefore, resource allocation between slices needs to be considered. For different services, slice patterns have different emphases, and are allocated different resources. Priority-based allocation of resources needs to be implemented through QoS.

Through network slicing, an operator can allocate appropriate network resources to specific slices, so that a network operator provides differentiated services at a user access layer of a RAN to ensure different transmission quality for the slices.

The foregoing describes technical terms in embodiments, and details are not described below again.

The following describes technical solutions in embodiments with reference to accompanying drawings.

The technical solutions in the embodiments may be applied to various communication systems, for example, a Long-Term Evolution (LTE) system, an LTE frequency-division duplex (FDD) system, an LTE time-division duplex (TDD) system, a Universal Mobile Telecommunication System (UMTS), a Worldwide Interoperability for Microwave Access (WiMAX) communication system, a 5G system, or new radio (NR). The 5G mobile communication system includes a non-standalone (NSA) 5G mobile communication system or a standalone (SA) 5G mobile communication system. The technical solutions provided may also be applied to a future communication system, for example, a sixth generation mobile communication system. The communication system may alternatively be a public land mobile network (PLMN), a device-to-device (D2D) communication system, a machine-to-machine (M2M) communication system, an internet of things (IoT) communication system, or another communication system.

FIG. 1 is a schematic diagram of a service-oriented architecture of an existing 5G network. The 5G network includes a RAN device, a user plane function (UPF), an access and mobility management function (AMF), a session management function (SMF), an authentication server function (AUSF), a network slice selection function (NSSF), a network exposure function (NEF), a network function repository function (NRF), a policy control function (PCF), a unified data management (UDM), a unified data repository (UDR), an application function (AF), a charging function (CHF), or the like.

As shown in FIG. 1, a terminal device accesses the 5G network by using the RAN device, and the terminal device communicates with the AUSF through an N1 interface (N1 for short). The RAN device communicates with the AMF through an N2 interface (N2 for short). The RAN device communicates with the UPF through an N3 interface (N3 for short). The SMF communicates with the UPF through an N4 interface (N4 for short), and the UPF accesses a data network through an N6 interface (N6 for short). In addition, control plane functions such as the AUSF, the AMF, the SMF, the NSSF, the NEF, the NRF, the PCF, the UDM, the UDR, the CHF, and the AF shown in FIG. 1 interact with each other through service-oriented interfaces. For example, a service-oriented interface exhibited by the AUSF is Nausf, a service-oriented interface exhibited by the AMF is Namf, a service-oriented interface exhibited by the SMF is Nsmf, a service-oriented interface exhibited by the NSSF is Nnssf, a service-oriented interface exhibited by the NEF is Nnef, a service-oriented interface exhibited by the NRF is Nnrf, a service-oriented interface exhibited by the PCF is Npcf, a service-oriented interface exhibited by the UDM is Nudm, a service-oriented interface exhibited by the UDR is Nudr, a service-oriented interface exhibited by the CHF is Nchf, and a service-oriented interface exhibited by the AF is Naf. For related function descriptions and interface descriptions, refer to a diagram of a 5G system architecture in the 23.501 standard. Details are not described herein.

Figure 2:
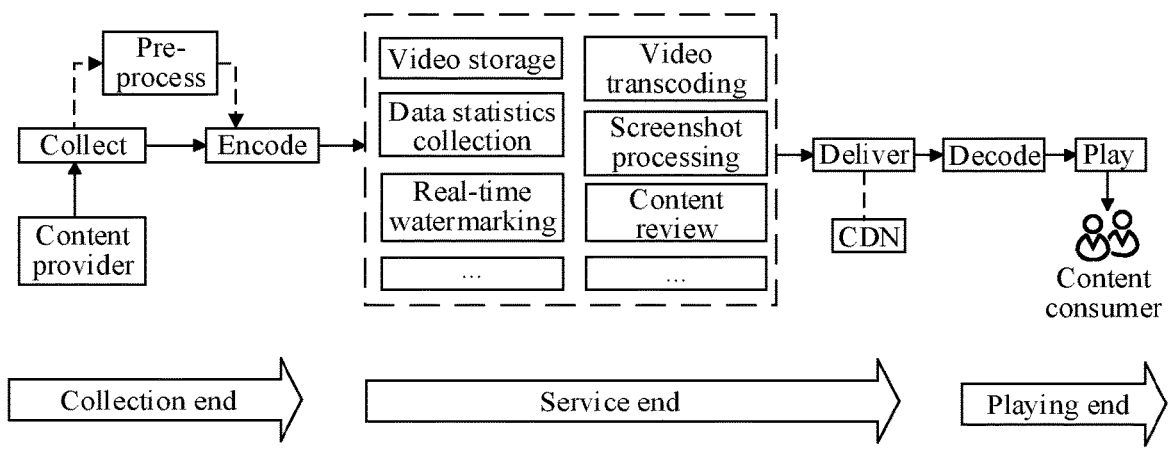
FIG. 2 is a schematic flowchart of an existing video cloud service.

FIG. 2 is a schematic flowchart of an existing video cloud service. As shown in FIG. 2, in a typical video cloud service procedure, a video collected by a content provider is first encoded into a specific format. Then, after the video is uploaded to a cloud server, to adapt to different network environments and player terminals, the video is usually transcoded at a cloud. A server provides personalized value-added services including data statistics collection, content review, real-time watermarking, and the like. A content delivery network (CDN) distribution of the video, and the video is decoded and finally played on a terminal device of a content consumer.

The following describes embodiments related to the technical solutions of this disclosure with reference to accompanying drawings.

The technical solutions provided in embodiments may be applied to various communication systems, for example, a communication system in which cloud computing is deployed and/or a CDN architecture is used. The cloud computing includes but is not limited to a public cloud, an edge cloud, a private cloud, a hybrid cloud, and the like. Services to which the technical solutions are applicable include but are not limited to a video service, a cloud gaming service, a virtual reality (VR) service, and the like.

Streaming media in embodiments is a media form in which audio, videos, and multimedia files are transmitted in a network in a streaming manner. Compared with a form of network playing after downloading, a typical feature of the streaming media is that continuous audio and video information is compressed and then placed on a network server, and a user can watch the information during downloading without waiting for an entire file to be completely downloaded. The streaming media technology may be applied to video on demand, video conferencing, tele-education, tele-medicine, and online live broadcast systems.

Figure 3:
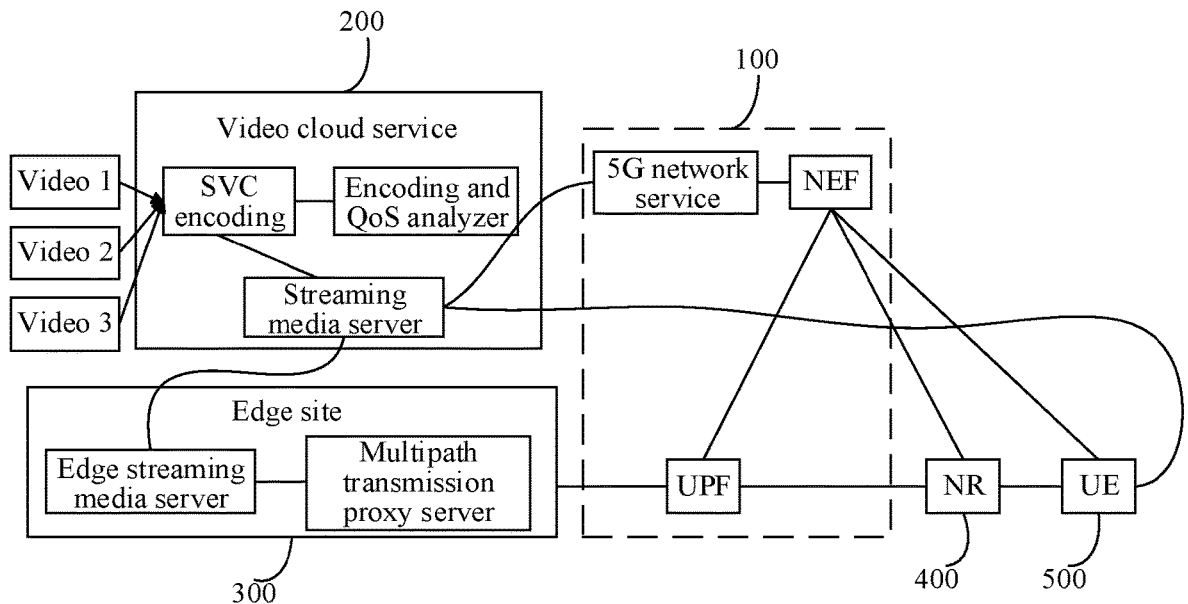
FIG. 3 is a schematic diagram of an architecture of a system according to an embodiment.

FIG. 3 is a schematic diagram of an architecture of an application system according to an embodiment. An example in which a communication system is 5G NR is used for description. As shown in FIG. 3, the application system includes a 5G network service and related device 100, a video cloud service 200, an edge site 300, an access network device 400, a terminal device 500, and the like.

FIG. 3 shows only an NEF device and a UPF device in the 5G network. The NEF is located between a 5G core (5GC) network and an external third-party application function (there may also be some internal AFs), and is responsible for exposing network data. All external applications need to access internal data of the 5GC through the NEF. The NEF provides corresponding security assurance to ensure security of the external applications to the network, and provides functions such as QoS customization capability exposure, mobility status event subscription, AF request distribution, and slice management for the external applications.

The UPF is configured for data packet routing and forwarding, data interaction with an external data network (DN), user plane QoS processing, flow control rule implementation (such as gating, redirection, and traffic diversion), and the like.

The video cloud service 200 includes an SVC encoding module, an encoding and QoS analyzer, and a streaming media server. The SVC encoding module is configured to perform, by using an SVC technology, layered encoding on a video stream stored in the video cloud service. The encoding and QoS analyzer is configured to analyze content sources, frame rates, scenarios (such as live broadcast and gaming), and the like of streaming media, summarize different QoS definitions, that is, analyze different requirements of different streaming media on transmission quality, and use resources corresponding to different QoS to provide a network service for the streaming media.

The streaming media server is configured to process and analyze data of the streaming media at a cloud. For example, the streaming media includes but is not limited to IPTV, video conferences, live broadcast, on demand, and short videos.

A cloud media service (for example, the video cloud service) in this embodiment is a media service that integrates a cloud computing architecture and streaming media, thereby improving performance of a media service system. Streaming media requires a large quantity of hardware and software technologies, and a large amount of data needs to be transmitted per second. Streaming media also requires consistency and continuity of data streams. Cloud computing can increase a bandwidth of a streaming media service, thereby improving quality of service of streaming media, and further improving flexibility and scalability of streaming media.

The edge site includes an edge streaming media server and a multi-stream transmission proxy server. The edge streaming media server serves as an intermediate device to connect the streaming media server and the terminal device, and transmits a media stream to the terminal device. The multi-stream transmission proxy server is configured to implement multi-stream transmission, which is connected to the edge streaming media server upward and obtains a plurality of media streams from the streaming media server, and is connected to a plurality of network links downward, that is, a plurality of network links established to the terminal device for transmitting different data streams. A protocol that may be used by the multi-stream transmission proxy server includes but is not limited to a multipath User Datagram Protocol (MP-UDP), a multipath Transmission Control Protocol (MP-TCP), a multipath Real-time Transport Protocol (MP-RTP), and the like. Optionally, a specific protocol to be used may be determined by a protocol agreement, a client, or a specific scenario. This is not limited in this disclosure.

The streaming media server in this embodiment is a core system of a streaming media application. A main function of the streaming media server is to transmit, by using a streaming protocol (such as RTP), a Real Time Streaming Protocol (RTSP), a multimedia messaging service (MMS), or a Real-Time Messaging Protocol (RTMP)), a video file to a client for a user to watch online, which may also collect, cache, schedule, transmit, and play streaming media content.

A function or a network element corresponding to the access network device may be a next-generation RAN (NG-RAN) device in the 5G mobile communication system.

In this embodiment, the terminal device is a device having a wireless transceiver function. The terminal device may be deployed on land, including indoor, outdoor, handheld, or in-vehicle forms, or may be deployed on a water surface (such as a ship), or may be deployed in air (for example, on an airplane, a balloon, or a satellite). The terminal device may be user equipment (UE). The UE includes a handheld device, a vehicle, an in-vehicle device, a wearable device, or a computing device having a wireless communication function. For example, the UE may be a mobile phone, a tablet computer, or a computer having a wireless transceiver function. Alternatively, the terminal device may be a VR terminal device, an AR terminal device, a wireless terminal device in industrial control, a wireless terminal device in unmanned driving, a wireless terminal device in telemedicine, a wireless terminal device in a smart grid, a wireless terminal device in a smart city, a wireless terminal device in a smart home, or the like. In this embodiment, an apparatus configured to implement a function of the terminal device may be the terminal device, or may be an apparatus that supports the terminal device in implementing the function, for example, a chip system. In this embodiment, the chip system may include a chip, or may include a chip and another discrete component. In this embodiment, an example in which an apparatus configured to implement a function of the terminal device is the terminal device is used to describe the technical solutions provided in embodiments.

The device names mentioned above are merely names, and do not constitute a limitation on the devices. It may be understood that in the 5G network and another network in the future, for example, the NEF, the UPF, and the streaming media server may alternatively have other names. This is not specifically limited in this embodiment. For example, the NEF may also be referred to as an NEF network element or a UPF entity, and the streaming media server may also be referred to as a cloud server or a central streaming media server. This is uniformly described herein, and details are not described below again.

Optionally, the devices mentioned above may be implemented by one device, may be jointly implemented by a plurality of devices, or may be one functional module in one device. This is not specifically limited in this embodiment. It may be understood that the functional module may be a network element in a hardware device, or may be a software functional module running on dedicated hardware, or may be a virtual module instantiated on a platform (for example, a cloud platform).

It should be noted that the network architecture and the service scenario described in embodiments are intended to describe the technical solutions in embodiments more clearly, and do not constitute a limitation on the technical solutions. A person of ordinary skill in the art may know that, as the network architecture evolves and a new service scenario emerges, the technical solutions provided in embodiments are also applicable to a similar technical problem.

Figure 4:
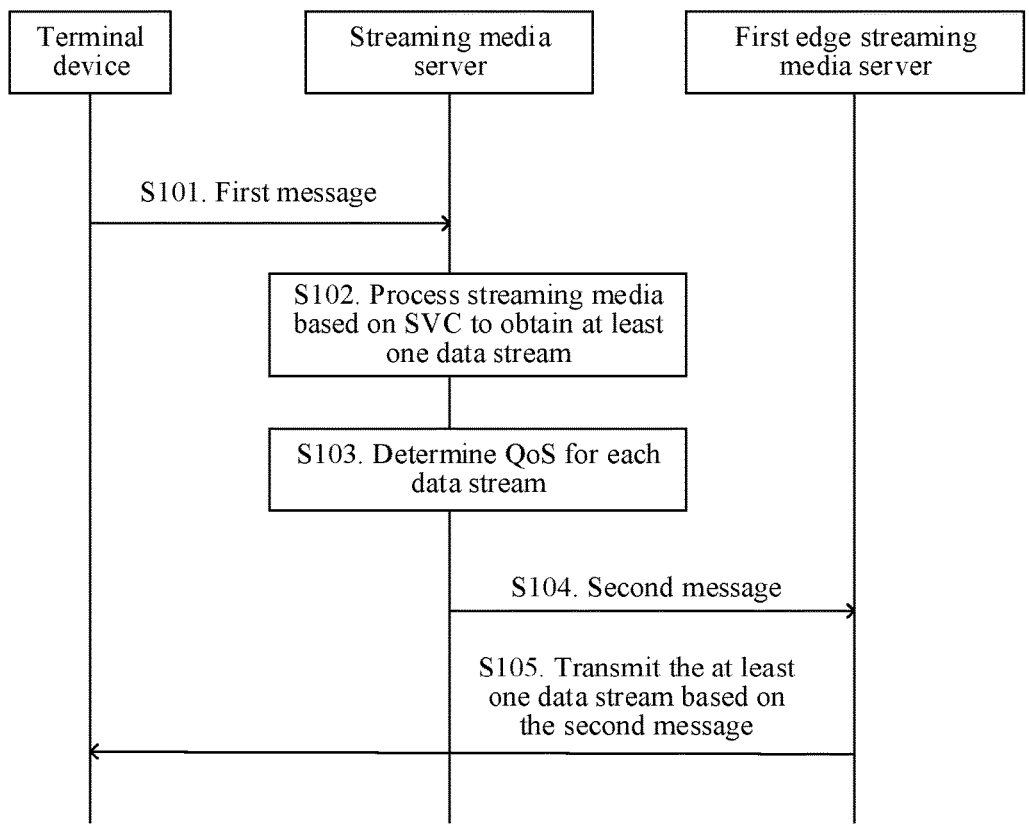
FIG. 4 is a flowchart of a streaming media transmission method according to an embodiment.

FIG. 4 shows a streaming media transmission method according to an embodiment. The method includes the following steps.

S101. A streaming media server receives a first message sent by a terminal device.

The first message includes a streaming media identifier, and the first message is used to request streaming media corresponding to the streaming media identifier. The streaming media server may also be referred to as a central streaming media server. This is not limited in this disclosure.

Optionally, the first message may further include an identifier of the terminal device and an Internet Protocol (IP) address of the terminal device.

S102. The streaming media server processes the streaming media based on SVC to obtain at least one data stream.

For example, the streaming media server includes an SVC encoding module, and a plurality of pieces of streaming media are stored in a video cloud service (for example, the streaming media server). The SVC encoding module of the streaming media server encodes the plurality of pieces of streaming media by using an SVC technology, to generate different layers. Each layer corresponds to one data stream.

It should be understood that the foregoing example is described by using an example in which the streaming media server and the SVC encoding module are integrated into one device. Optionally, when the streaming media server and the SVC encoding module are implemented by using two devices, this step may be completed by the SVC encoding module.

S103. The streaming media server determines QoS for each data stream.

A preset mapping relationship is stored in the streaming media server, and the streaming media server may determine QoS for each data stream based on the preset mapping relationship. The preset mapping relationship is a mapping relationship between a stream identifier of a data stream and QoS. Optionally, the QoS may be identified by using a QoS identifier (ID) or a QoS level. This is not limited in this disclosure.

For example, the preset mapping relationship is shown in Table 1.

TABLE 1

| Streaming media identifier | Layer identifier | QoS ID (level) identifiable by a 5G network | Priority level |
| --- | --- | --- | --- |
| stream1 | Layer1 | 1 | 1 |
|  | Layer2 | 4 |  |
| stream2 | Layer2 | 1 | 2 |
| streamN | LayerN | 3 | 1 |

A streaming media identifier in this embodiment may be represented by using a "streaming media identifier". One piece of streaming media may refer to one video. For example, stream1 may refer to one video. At least one data stream is generated when SVC encoding is performed on the streaming media. A stream identifier of the data stream may be represented by a "layer identifier". The stream identifier of the data stream corresponds to a QoS ID (level). In this embodiment, QoS in a 5G network is used for description. Therefore, the QoS ID (level) may be identified by the 5G network. A streaming media identifier corresponds to a priority level, which represents a priority of the streaming media.

For example, the streaming media identifier stream1 is used as an example, and a priority level of streaming media represented by stream1 is 1. Data streams represented by layer1 and layer2 are generated by performing SVC encoding on the streaming media represented by stream1. A QoS ID corresponding to layer1 is 1, that is, a resource corresponding to QoS1 needs to be used to transmit the data stream represented by layer1. A QoS ID corresponding to layer2 is 4, that is, a resource corresponding to QoS4 needs to be used to transmit the data stream represented by layer2.

Optionally, the preset mapping relationship may be established by an encoding and QoS analyzer.

In a possible design, after the encoding and QoS analyzer establishes the preset mapping relationship, a copy of the mapping relationship is delivered to the streaming media server.

In another possible design, after the encoding and QoS analyzers establishes the preset mapping relationship, the preset mapping relationship is not actively delivered to the streaming media server, and subsequently, the streaming media server actively requests to obtain the preset mapping relationship from the encoding and QoS analyzer when necessary. Optionally, the streaming media server may request to obtain all content of the preset mapping relationship, or the streaming media server may request to obtain a part of content of the preset mapping relationship, that is, a mapping relationship related to the streaming media.

In still another possible design, the encoding and QoS analyzer and the streaming media server may be integrated, that is, functions of the two may be implemented by using one device. In this case, the streaming media server may establish and store the preset mapping relationship.

It should be understood that the QoS in this embodiment and a characteristic (for example, a delay, a packet loss rate, or a throughput rate) corresponding to the QoS may be system default, or may be defined by a user based on a requirement of the user. For example, a cloud service provider defines new QoS based on factors such as a service type, a user level, and a terminal level and indicators such as a buffer speed, a stream playing speed, definition, frame freezing, second opening, a delay, and a time to first frame. This is not limited in this disclosure.

S104. The streaming media server sends a second message to a first edge streaming media server.

The second message includes the QoS of each of the at least one data stream. The second message indicates the first edge streaming media server to transmit the at least one data stream to the terminal device by using a resource corresponding to the QoS of each data stream. The resource corresponding to the QoS may be a 5G network slice resource.

It should be understood that 5G network slice resources have been pre-allocated, and using a slice resource corresponding to QoS to transmit a data stream means that the network slice can ensure that a network service corresponding to the QoS, for example, a delay, a bandwidth, or a throughput rate, is provided for the data stream.

It should be understood that the QoS and the data stream are in a one-to-one correspondence, that is, a resource of QoS of one data stream is used to transmit the one data stream corresponding to the QoS.

S105. The first edge streaming media server transmits the at least one data stream to the terminal device based on the second message.

For example, the first edge streaming media server first transmits the at least one data stream to a multipath transmission proxy server based on the second message, and then the multipath transmission proxy server transmits the at least one data stream to the terminal device.

Based on this solution, the streaming media server processes, by using the SVC technology, the streaming media requested by the terminal, to obtain the at least one data stream, and determines the QoS for each data stream, so that the edge streaming media server may transmit the at least one data stream to the terminal device by using the resource corresponding to the QoS of each data stream. Based on the SVC technology, multi-stream transmission is implemented, and the edge streaming media server pushes the streaming media based on different requirements, thereby ensuring transmission quality of the streaming media.

The second message further includes a stream identifier of the at least one data stream. Before step S105, the method further includes the following steps (not shown in the figure).

S106. The first edge streaming media server obtains the at least one data stream from the streaming media server based on the second message.

The first edge streaming media server may obtain the corresponding data stream based on the stream identifier of the data stream.

S107. The first edge streaming media server establishes at least one connection by using the resource corresponding to the QoS.

The at least one connection is used to transmit the at least one data stream. Each connection corresponds to one piece of QoS, and is used to transmit a corresponding data stream.

Figure 5:
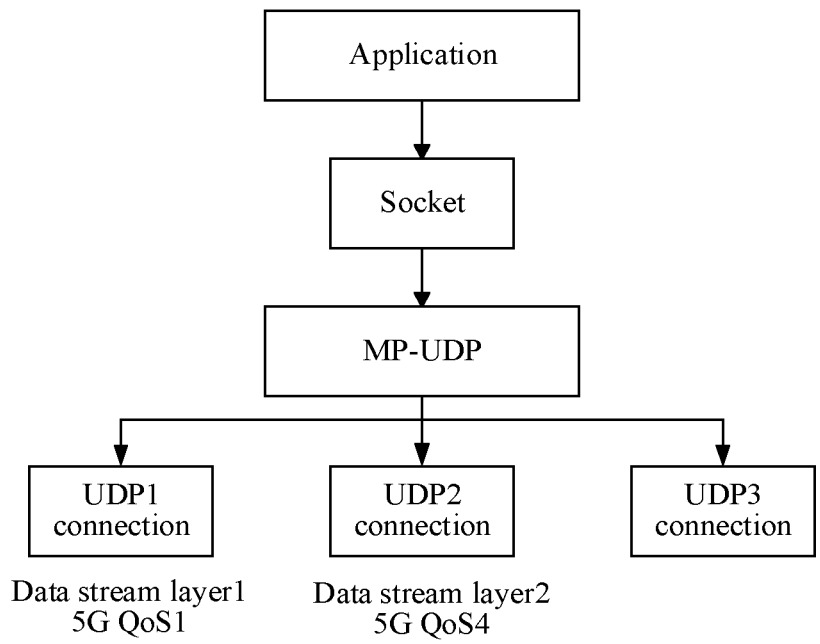
FIG. 5 is a schematic diagram of streaming media transmission according to an embodiment.

For example, as shown in FIG. 5, an example in which the multipath transmission proxy server is an MP-UDP proxy server is used for description with reference to Table 1. First, the first edge streaming media server establishes a connection to the MP-UDP proxy server, and then the MP-UDP proxy server invokes an MP-UDP protocol to establish at least one UDP connection to the terminal device by using a 5G network slice resource corresponding to the QoS. For example, a connection UDP1 established by using a 5G network slice resource corresponding to 5G QoS1 is used to transmit the data stream represented by layer1 of stream1, and a connection UDP2 established by using a 5G network slice resource corresponding to 5G QoS4 is used to transmit the data stream represented by layer2 of stream1.

Figure 6:
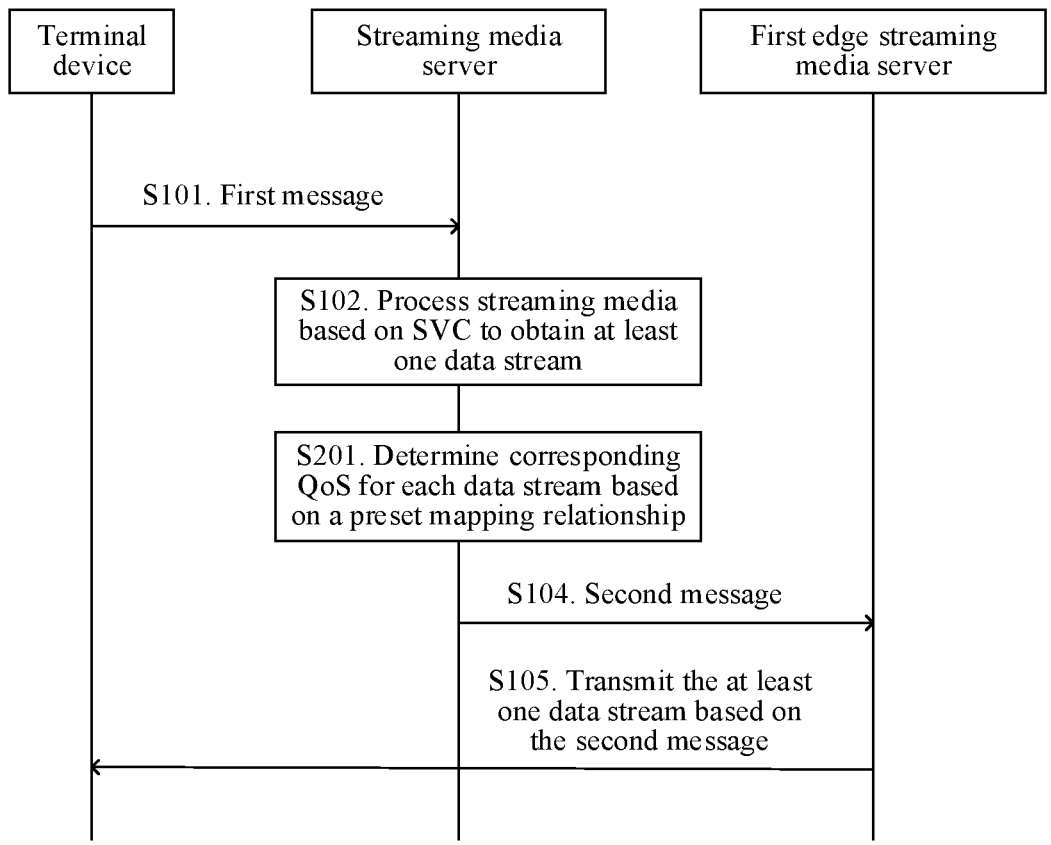
FIG. 6 is a flowchart of another streaming media transmission method according to an embodiment.

In the embodiment shown in FIG. 4, step S103 may be specifically implemented as the following step, as shown in FIG. 6.

S201. The streaming media server determines corresponding QoS for each data stream based on a preset mapping relationship.

The preset mapping relationship is preconfigured by a streaming media provider.

In a possible scenario, for example, the streaming media provider is Tencent Video. Tencent Video purchases 5G network slice resources from an operator to transmit videos of Tencent Video. Specifically, parameters such as a user quantity, an anchor range, a QoS level, a slice ID, and a QoS ID are provisioned by a network device (for example, an NEF). It should be noted that these parameters provisioned by the NEF are defined by a 5G network system, and are selected by Tencent Video, that is, the streaming media provider stored in the video cloud service, based on a requirement of Tencent Video. The user quantity is a quantity of users who can be served by a slice ID. The anchor range is cities or users to which a slice resource corresponding to a slice ID is applicable. The QoS level, the slice ID, and the QoS ID are in a one-to-one relationship.

For example, Tencent Video may provision the parameters at the operator based on a requirement of Tencent Video. Specifically, a 5G network slice that can ensure a delay of 1 ms is provisioned. The network slice may serve 1 million users in Shenzhen, to transmit data streams of a live broadcast service. In this scenario, Tencent Video determines which type of streaming media is transmitted by using a network slice resource corresponding to which QoS. Therefore, the streaming media is associated with the network slice resource.

It should be understood that the parameters are merely examples for description. In another network in the future, the parameters may further include other content or may have other names. This is not limited in this embodiment.

It should be noted that QoS of streaming media is related to subjective perception of a user. Therefore, in actual application, QoS-related indicators, such as a buffer speed, a stream playing speed, definition, frame freezing, second opening, a delay, and a time to first frame, may be flexibly defined based on requirements. This is not limited in this disclosure.

For example, the streaming media server may analyze a QoS requirement of a data stream. For example, QoS indicators include a buffer speed and definition. If the data stream has high requirements on the buffer speed and the definition, the streaming media server may match the data stream with QoS with a relatively high level, and establish a mapping relationship between a stream identifier of the data stream and the QoS. When the data stream is subsequently transmitted, a 5G network slice resource corresponding to the QoS may ensure, for the data stream, quality of service required by the data stream.

In another possible scenario, for example, the streaming media provider is Huawei. Huawei can provide streaming media and 5G network slice resources for another vendor (such as Tencent Video). The network slice resources are purchased by Huawei from an operator.

When Tencent Video purchases streaming media and network slices of Huawei, Tencent Video may purchase different network slices based on a requirement of Tencent Video. For example, if Tencent Video purchases a network slice with a relatively high level and required streaming media, Huawei allocates a network slice resource with a relatively high level to Tencent Video, that is, a network slice resource with relatively good QoS can be ensured to transmit the streaming media purchased by Tencent Video.

Therefore, in this scenario, the streaming media is not associated with the network slice resource. Tencent Video does not need to define or provision corresponding network slice resources based on QoS requirements of different streaming media, but only needs to purchase network slice resources of different levels based on requirements to transmit streaming media that is purchased by Tencent Video and that needs to be transmitted.

Based on this solution, the corresponding QoS is determined for each data stream based on the preset mapping relationship, so that during subsequent data stream transmission, the data stream may be transmitted based on the resource corresponding to the QoS, thereby ensuring transmission quality of the streaming media.

Before step S104 in the embodiment shown in FIG. 4 is performed, it needs to be determined whether the at least one data stream requested by the terminal device can be transmitted based on the resource corresponding to the QoS of the data stream. This operation may be implemented by using a method provided in embodiments shown in FIG. 7 and FIG. 8.

Figure 7:
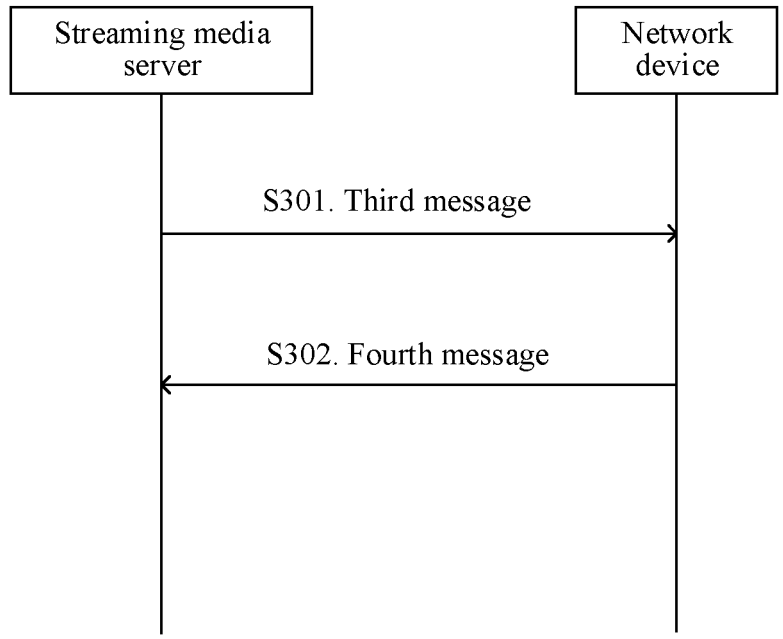
FIG. 7 is a flowchart of another streaming media transmission method according to an embodiment.

As shown in FIG. 7, the first message further includes the identifier of the terminal device, and before step S104, the method further includes the following steps.

S301. The streaming media server sends a third message to a network device. Correspondingly, the network device receives the third message from the streaming media server.

Optionally, the network device is an NEF, and the streaming media server may send the third message to the NEF. The third message is used to request to bind the identifier of the terminal device to the resource corresponding to the QoS. It should be understood that the "bind" means transmitting, by using the resource corresponding to the QoS, the data stream that the terminal requests to obtain.

S302. The streaming media server receives a fourth message sent by the network device. Correspondingly, the network device sends the fourth message to the streaming media server.

Optionally, the network device is an NEF, and the streaming media server may receive the fourth message from the NEF. The fourth message indicates a result of binding the identifier of the terminal device to the resource corresponding to the QoS.

Optionally, after receiving the third message, the NEF determines whether the resource corresponding to the QoS can be used for the terminal device, that is, determines whether a quantity of users currently served by the provisioned network slice resource corresponding to the QoS and/or a geographical location of the terminal device meets a requirement of an anchor range, or the like. The NEF finally determines the result of binding the resource corresponding to the QoS to the identifier of the terminal device, and sends the fourth message to the streaming media server.

In a possible design, if the streaming media server determines, based on the fourth message, that the identifier of the terminal device is successfully bound to the resource corresponding to the QoS, the second message further includes the stream identifier of the at least one data stream and a mapping relationship between a stream identifier of each data stream and QoS of each data stream.

Correspondingly, after receiving the third message sent by the streaming media, the network device (for example, the NEF) determines that the identifier of the terminal device is successfully bound to the resource corresponding to the QoS, that is, the resource corresponding to the QoS can be used for the terminal device to transmit the data stream of the terminal device. In this case, the NEF delivers related configuration information to a UPF, an access network device, an access point (AP), and the like, so that when subsequently transmitting a data stream of the terminal device, each network device may transmit the data stream of the terminal device by using the resource corresponding to the QoS. For specific configuration, refer to configuration of an existing network slice resource. This is not extended in this disclosure.

It should be noted that this disclosure is described by using an example in which the terminal requests to obtain one piece of streaming media. Therefore, the second message sent by the streaming media server to the first edge streaming media server includes only the stream identifier of the data stream.

Stream identifiers of data streams may be the same. For example, as shown in Table 1, a stream identifier of a data stream generated by encoding stream1 may be Layer 2, and a corresponding QoS identifier is 4. A stream identifier of a data stream generated by encoding stream2 may also be Layer 2, but a corresponding QoS identifier is 3. Therefore, if only a stream identifier of a target data stream is transmitted, streaming media from which the data stream is generated and a QoS identifier corresponding to the stream identifier of the data stream cannot be determined. Therefore, when the terminal device requests to obtain a plurality of pieces of streaming media, the second message sent by the streaming media server to the first edge streaming media server may further include streaming media identifiers. This is not limited in this disclosure.

It should be noted that this embodiment is described by using an example in which stream identifiers of data streams may be the same. In actual application, if the stream identifiers of the data streams are set to be different, the second message sent by the streaming media server to the first edge streaming media server may alternatively not include a streaming media identifier. This is not limited in this disclosure.

Optionally, after receiving the mapping relationship, the edge streaming media server may cache the mapping relationship.

For example, the streaming media server may transmit only a part of the preset mapping relationship (shown in Table 1) to the edge streaming media server, that is, transmit only a mapping table related to the streaming media requested by the terminal device. For example, the streaming media is stream1. The mapping relationship between the stream identifier and the QoS of the at least one data stream may be shown in Table 2.

TABLE 2

| Streaming media identifier | Layer identifier | QoS identifier (level) identifiable by a 5G network | Priority level |
|---|---|---|---|
| stream1 | Layer1 | 1 | 1 |
|  | Layer2 | 4 |  |

The mapping relationship between the stream identifier of each data stream and the QoS of each data stream indicates the first edge streaming media server to transmit the at least one data stream to the terminal device based on the mapping relationship.

Figure 8:
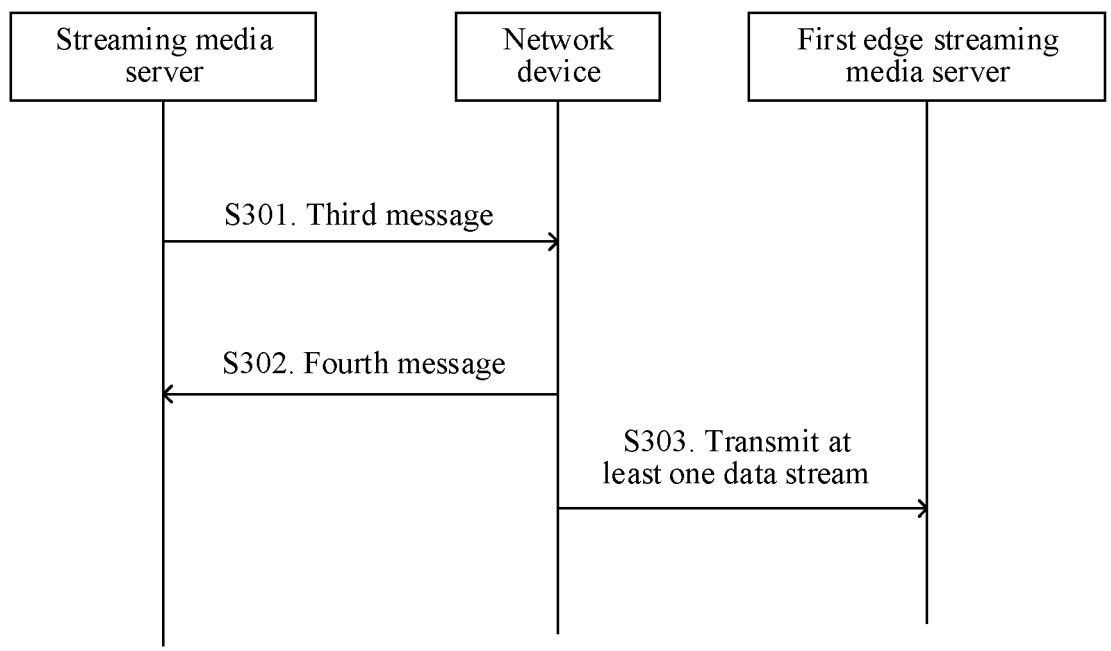
FIG. 8 is a flowchart of another streaming media transmission method according to an embodiment.

When the streaming media server determines, based on the fourth message, that the identifier of the terminal device is successfully bound to a target first QoS identifier, after step S302 shown in FIG. 7, the method further includes step S303 shown in FIG. 8.

As shown in FIG. 8, after step S302, the method further includes the following step.

S303. The streaming media server transmits the at least one data stream to the first edge streaming media server.

For example, the streaming media server may first transmit the at least one data stream to the first edge streaming media server, and then send the second message to the first edge streaming media server. Alternatively, the streaming media server may first send the second message to the first edge streaming media server, and then transmit the at least one data stream to the first edge streaming media server. Alternatively, the streaming media server may simultaneously send the second message and transmit the at least one data stream to the first edge server. A sequence of sending the second message and transmitting the data stream is not limited in this disclosure. This is uniformly described herein. Details are not described below again.

The embodiments shown in FIG. 7 and FIG. 8 are a case in which the data stream can be transmitted based on the resource corresponding to the QoS of the data stream. However, in some cases, the data stream cannot be transmitted based on the resource corresponding to the QoS of the data stream.

Figure 9:
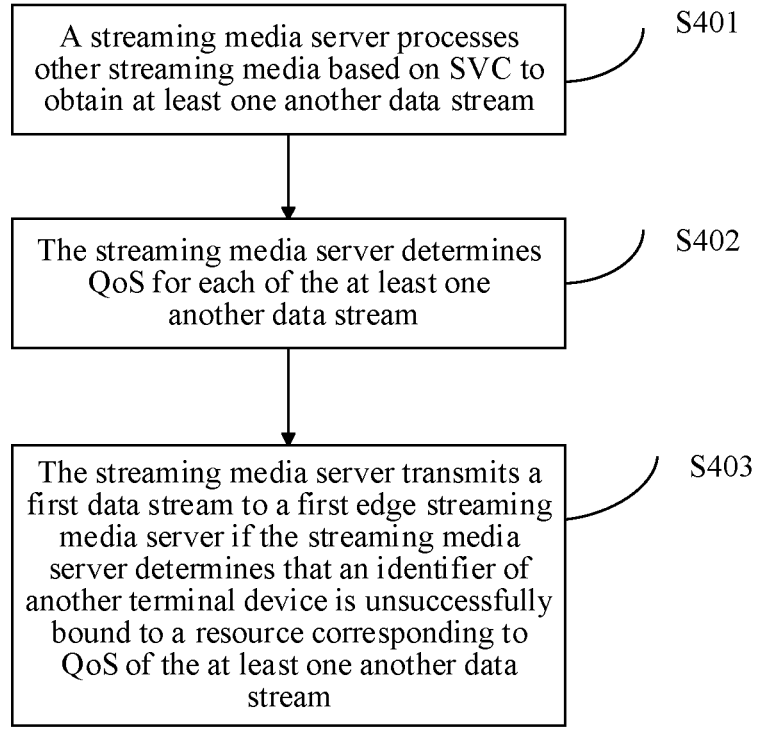
FIG. 9 is a flowchart of another streaming media transmission method according to an embodiment.

Therefore, this disclosure provides another streaming media transmission method. As shown in FIG. 9, the method includes the following steps.

S401. The streaming media server processes other streaming media based on SVC to obtain at least one another data stream.

The other streaming media is streaming media requested by another terminal device. It should be understood that the another terminal device is different from the terminal device mentioned in the foregoing embodiment.

The at least one another data stream includes a first data stream and at least one second data stream, the first data stream represents a data stream of basic quality, and a data stream formed by the at least one second data stream and the first data stream has higher quality than the data stream of basic quality.

S402. The streaming media server determines QoS for each of the at least one another data stream.

In this embodiment, a specific description of determining, by the streaming media server, the QoS for the data stream is the same as that in the foregoing embodiment, and details are not described herein again.

S403. The streaming media server transmits the first data stream to the first edge streaming media server if the streaming media server determines that an identifier of the another terminal device is unsuccessfully bound to a resource corresponding to QoS of the at least one another data stream.

Optionally, the "unsuccessfully bound" includes the following cases:

Case 1: A stream identifier of the at least one second data stream requested by the another terminal device is unsuccessfully matched with a resource corresponding to QoS of the data stream, and a stream identifier of the first data stream is successfully matched with a resource corresponding to QoS of the data stream. In this case, it is determined that the identifier of the another terminal device is unsuccessfully bound to the resource corresponding to the QoS of the data stream.

Case 2: A stream identifier of the at least one second data stream requested by the another terminal device is successfully matched with a resource corresponding to QoS of the data stream, and a stream identifier of the first data stream is unsuccessfully matched with a resource corresponding to QoS of the data stream. In this case, it is determined that the identifier of the another terminal device is unsuccessfully bound to the resource corresponding to the QoS of the data stream.

Case 3: If neither a stream identifier of the at least one second data stream requested by the another terminal device nor a stream identifier of the first data stream is successfully matched with a resource corresponding to QoS, it is determined that the identifier of the another terminal device is unsuccessfully bound to the resource corresponding to the QoS of the data stream.

Optionally, how the streaming media server determines the binding result may be directly indicated by using the fourth message. For example, the fifth message directly includes "successfully matched" or "unsuccessfully matched" as a direct indication to the streaming media server. Alternatively, the fifth message may include specific content in the foregoing three cases as an indirect indication to the streaming media server. An indication manner is not specifically limited in this disclosure.

In this example, the streaming media server may switch to a non-layered data stream for transmission, that is, transmit only a base layer video stream to the first edge streaming media server. In case 2 or case 3, the first data stream may be transmitted by using a resource corresponding to default QoS, or may be transmitted by using a resource corresponding to QoS obtained after a requirement is changed. In case 1, the first data stream may be transmitted by using the resource corresponding to the successfully matched QoS. It should be understood that the foregoing cases are merely example descriptions provided for ease of understanding of embodiments and does not constitute a limitation on embodiments.

It should be noted that the embodiment shown in FIG. 9 is a supplementary description of the technical solutions of this disclosure, and this embodiment may be used in combination with another embodiment.

Figure 10:
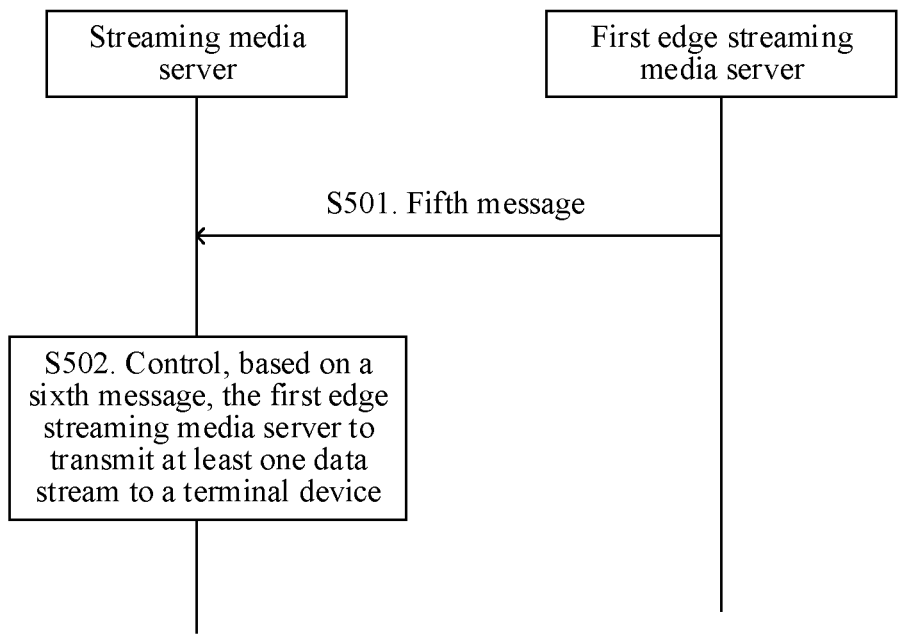
FIG. 10 is a flowchart of another streaming media transmission method according to an embodiment.
Figure 11:
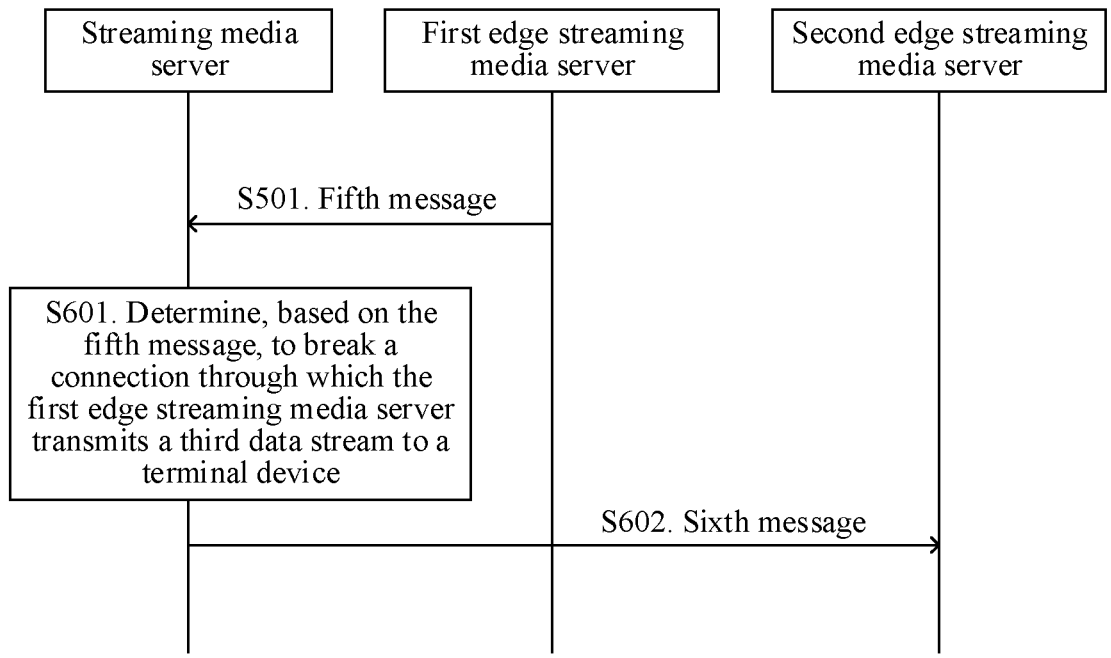
FIG. 11 is a flowchart of another streaming media transmission method according to an embodiment.

In a multi-edge and heavily-loaded scenario, that is, when at least one connection is established between the terminal device and each of at least two edge streaming media servers to transmit a data stream, if an edge streaming media server is overloaded, a decision may be made by using a method provided in embodiments shown in FIG. 10 and FIG. 11.

FIG. 10 shows a streaming media transmission method according to an embodiment. The method includes the following steps.

S501. The streaming media server receives a fifth message sent by the first edge streaming media server.

The fifth message includes a priority of the streaming media and/or a priority of the at least one data stream.

Optionally, the fifth message further includes parameters such as a second opening rate, a video freeze rate, and video freeze duration.

Optionally, at least one connection may be established between the first edge streaming media server and the terminal device, and the at least one connection is used to transmit the at least one data stream generated by encoding the streaming media.

S502. The streaming media server controls, based on the fifth message, the first edge streaming media server to transmit the at least one data stream to the terminal device.

For example, the streaming media server may dynamically decide, comprehensively based on bandwidth statuses of a plurality of points, for example, a bandwidth status of the first edge streaming media server and/or a bandwidth status of another edge streaming media server, to break at least one connection between the first edge streaming media server and the terminal device and/or retain at least one connection between the first edge streaming media server and the terminal device.

Optionally, when the first edge streaming media server establishes a connection to at least one terminal device to transmit at least one data stream, the streaming media server may dynamically decide to break all connections between the first edge streaming media server and the at least one terminal device and/or retain all connections between the first edge streaming media server and the at least one terminal device.

Based on this solution, in a multi-edge, multipath, and heavily-loaded scenario, that is, in a scenario in which the terminal device establishes connections to a plurality of edge streaming media servers, when an edge streaming media server is overloaded, the streaming media servers may decide to control at least one network link between the edge streaming media server and the terminal device, to ensure transmission quality of the streaming media.

As shown in FIG. 11, step S502 may be specifically implemented as the following steps.

S601. The streaming media server determines, based on the fifth message, to break a connection through which the first edge streaming media server transmits a third data stream to the terminal device.

The third data stream belongs to the at least one data stream. It should be understood that the third data stream may be one or more data streams. This is not limited in this disclosure.

For example, when the first edge streaming media server has relatively good service performance, the streaming media server may break, based on the fifth message, a connection of at least one data stream with a lower priority, and retain a connection of at least one data stream with a higher priority. When the first edge streaming media server has relatively poor service performance, the streaming media server may break, based on the fifth message, a connection of at least one data stream with a higher priority, and retain a connection of at least one data stream with a lower priority. It should be understood that a connection to be broken and/or retained may be selected based on an actual situation or requirement. This is not limited in this disclosure.

S602. The streaming media server sends a sixth message to a second edge streaming media server.

The sixth message includes a stream identifier of the third data stream, and the sixth message indicates the second edge streaming media server to transmit the third data stream to the terminal device.

Optionally, the sixth message may further include an IP address of the terminal device. Correspondingly, a connection is established between the second edge streaming media server and the terminal device to transmit the third data stream.

It should be understood that communication between the edge streaming media server and the terminal device may be implemented by using a multi-stream transmission proxy server, for example, an MP-UDP proxy server. For example, the second edge streaming media server first establishes at least one connection to the MP-UDP proxy server, and then the MP-UDP proxy server refreshes a terminal connection, that is, the MP-UDP proxy server establishes at least one UDP connection to the terminal device. The at least one UDP connection is used to transmit the third data stream.

Figure 12:
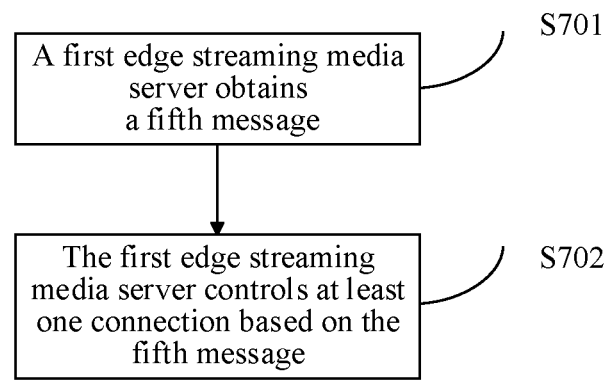
FIG. 12 is a flowchart of another streaming media transmission method according to an embodiment.

In a single-edge and heavily-loaded scenario, that is, the terminal device establishes at least one connection to one edge streaming media server to transmit a data stream, when the edge streaming media server is overloaded, a dynamic decision may be made by using a method provided in an embodiment shown in FIG. 12.

FIG. 12 shows another streaming media transmission method according to an embodiment. The method includes the following steps.

S701. The first edge streaming media server obtains a fifth message.

The fifth message includes a priority of the streaming media and/or a priority of the at least one data stream.

Optionally, the fifth message may further include parameters such as a second opening rate, a video freeze rate, and video freeze duration. These parameters may be obtained from the terminal device.

S702. The first edge streaming media server controls the at least one connection based on the fifth message.

For example, the first edge streaming media server may dynamically decide, based on a bandwidth status of the first edge streaming media server and corresponding QoS evaluation, to break at least one connection between the first edge streaming media server and the terminal device and/or retain at least one connection between the first edge streaming media server and the terminal device.

For example, when the first edge streaming media server determines that a bandwidth of the first edge streaming media server is insufficient, or a utilization rate of a graphics processing unit (GPU) or a central processing unit (CPU) is excessively high, the first edge streaming media server may break at least one data stream with a lower priority and retain at least one data stream with a higher priority based on the fifth message. Alternatively, through the QoS evaluation, at least one data stream with a higher QoS level is broken, and at least one data stream with a lower QoS level is retained, to reduce load of the first edge streaming media server. It should be understood that a connection to be broken and/or retained may be selected based on an actual situation or requirement. This is not limited in this disclosure.

Based on this solution, in a single-edge, multipath, and heavily-loaded scenario, that is, in a scenario in which the terminal device establishes at least one connection to one edge streaming media server, when the edge streaming media server is overloaded, the edge streaming media server may decide to control a plurality of network links between the edge streaming media server and the terminal device, thereby ensuring transmission quality of the streaming media.

The solutions provided in embodiments are mainly described above from a perspective of a method. It may be understood that, to implement the foregoing functions, a communication apparatus (for example, the streaming media server or the edge streaming media server) includes hardware structures and/or software modules corresponding to the functions. With reference to units and algorithm steps of examples described in embodiments, embodiments can be implemented in a form of hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation falls beyond the scope of the technical solutions in embodiments.

In embodiments, the communication apparatus may be divided into functional modules based on the foregoing method example. For example, each functional module may be obtained through division based on each corresponding function, or two or more functions may be integrated into one processing unit. The integrated unit may be implemented in a form of hardware, or may be implemented in a form of a software functional unit. It should be noted that, in embodiments, division of the units is an example and is merely logical function division, and may be other division during actual implementation.

Figure 13:
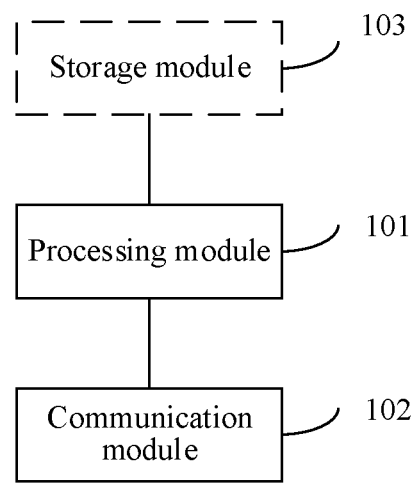
FIG. 13 is a schematic diagram of a structure of a communication apparatus according to an embodiment.

FIG. 13 shows a communication apparatus according to an embodiment. The communication apparatus includes a processing module 101 and a communication module 102.

In a possible example, the communication apparatus is a streaming media server. The processing module 101 is configured to support the streaming media server in performing step S102 in FIG. 4, step S201 in FIG. 6, and the like, and/or another processing operation that needs to be performed by the streaming media server in embodiments. The communication module 102 is configured to support the streaming media server in performing step S101 in FIG. 4, step S104 in FIG. 4, and the like, and/or another communication operation that needs to be performed by the streaming media server in embodiments.

In another possible example, the communication apparatus is an edge streaming media server. The processing module 101 is configured to support the edge streaming media server in performing step S107, and/or another processing operation that needs to be performed by the edge streaming media server in embodiments. The communication module is configured to support the edge streaming media server in performing step S105 in FIG. 4 and the like, and/or another communication operation that needs to be performed by the edge streaming media server in embodiments.

Optionally, the communication apparatus may include a storage module 103 configured to store program code and data of the communication apparatus. The data may include but is not limited to original data, intermediate data, or the like.

The processing module 101 may be a processor or a controller, for example, may be a CPU, a general-purpose processor, an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this disclosure. Alternatively, the processor may be a combination for implementing a computing function, for example, a combination of one or more microprocessors, or a combination of a DSP and a microprocessor.

The communication module 102 may be a communication interface, a transceiver, a transceiver circuit, or the like. The communication interface is a general name. In a specific implementation, the communication interface may include a plurality of interfaces, for example, an interface between a base station and a terminal and/or another interface.

The storage module 103 may be a memory.

Figure 14:
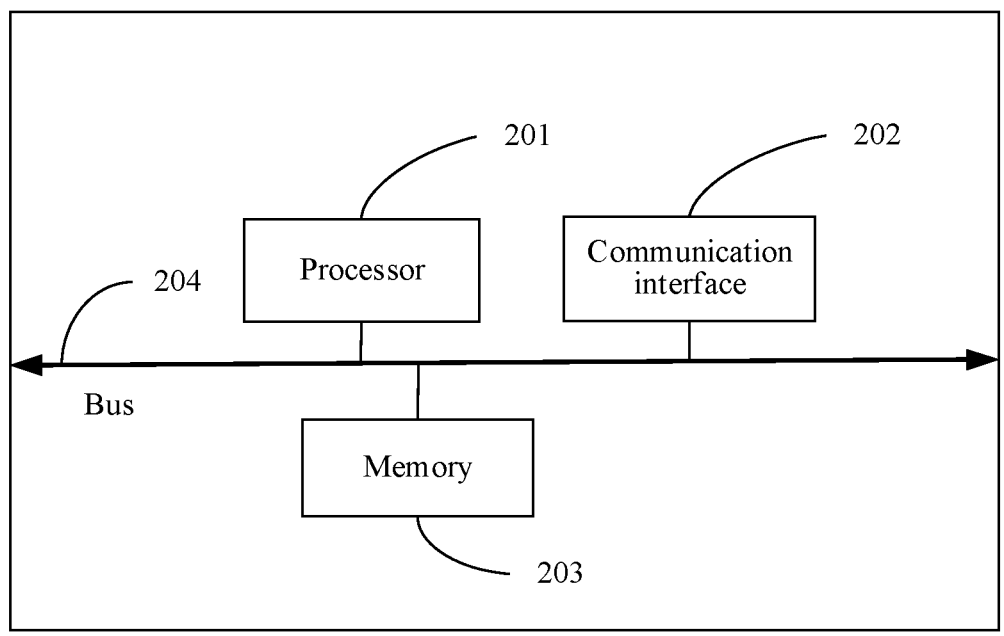
FIG. 14 is a schematic diagram of a structure of another communication apparatus according to an embodiment.

When the processing module 101 is a processor, the communication module 102 is a communication interface, and the storage module 103 is a memory, the communication apparatus in this embodiment may be shown in FIG. 14. The communication apparatus is a computer.

As shown in FIG. 14, the communication apparatus includes a processor 201, a communication interface 202, and a memory 203. Optionally, the communication apparatus may further include a bus 204. The communication interface 202, the processor 201, and the memory 203 may be connected to each other by using the bus 204. The bus 204 may be a Peripheral Component Interconnect (PCI) bus, an Extended Industry Standard Architecture (EISA) bus, or the like. The bus 204 may include an address bus, a data bus, a control bus, and the like. For ease of representation, only one bold line is used to represent the bus in FIG. 14, but this does not mean that there is only one bus or only one type of bus.

The memory stores instructions, and the processor is configured to execute the instructions stored in the memory, to enable the computer device to perform the method described in the foregoing embodiment.

Optionally, an embodiment further provides a computer program product carrying computer instructions. When the computer instructions are run on a computer, the computer is enabled to perform the method described in the foregoing embodiment.

Optionally, an embodiment further provides a computer-readable storage medium. The computer-readable storage medium stores computer instructions. When the computer instructions are run on a computer, the computer is enabled to perform the method described in the foregoing embodiment.

A person of ordinary skill in the art may understand that all or some of the foregoing embodiments may be implemented by software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to embodiments are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided, it should be understood that the disclosed system, apparatus, and method may be implemented in other manners. For example, the apparatus embodiment described above is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The units described as separate parts may or may not be physically separate, and a part displayed as a unit may or may not be a physical unit, that is, may be located at one position, or may be distributed on a plurality of devices. Some or all of the units may be selected based on actual requirements to achieve the objectives of the solutions of embodiments.

Based on the foregoing descriptions of the implementations, a person skilled in the art may clearly understand that this disclosure may be implemented by software plus universal hardware or by hardware only. In most circumstances, the former is a preferred implementation. Based on such an understanding, the technical solutions of this disclosure essentially or the part making contribution may be implemented in a form of a software product. The computer software product is stored in a readable storage medium, such as a floppy disk, a hard disk, or an optical disc of a computer, and includes several instructions for instructing a computer device (which may be a personal computer, a server, or a network device) to perform the methods described in embodiments.

The foregoing descriptions are merely specific implementations, but are not intended to limit the protection scope of this disclosure. Any variation or replacement within the technical scope disclosed shall fall within the protection scope of this disclosure. Therefore, the protection scope of this disclosure shall be subject to the protection scope of the claims.

What is claimed is:

1. A method implemented by a streaming media server and comprising:
    receiving, from a first terminal device, a first message comprising a first streaming media identifier and requesting first streaming media corresponding to the first streaming media identifier;
    processing the first streaming media based on scalable video coding (SVC) to obtain a first data stream and a second data stream;
    determining a first quality of service (QOS) of the first data stream;
    determining a second QoS of the second data stream; and
    sending, to a first edge streaming media server, a second message comprising the first QoS, comprising the second QoS, and instructing the first edge streaming media server to transmit the first data stream to the first terminal device using a first resource corresponding to the first QoS and to transmit the second data stream to the first terminal device using a second resource corresponding to the second QoS, wherein the first resource and the second resource are different, and wherein each of the first resource and the second resource is a network slice resource comprising a radio sub-slice resource, a bearer sub-slice resource, or a core network sub-slice resource.

2. The method of claim 1, wherein the first resource or the second resource is a fifth-generation (5G) network slice resource.

3. The method of claim 1, further comprising:

further determining the first QoS based on a preset mapping relationship preconfigured by a streaming media provider; or further determining the second QoS based on the preset mapping relationship.

4. The method of claim 1, wherein the first message further comprises an identifier of the first terminal device, and wherein before sending the second message, the method further comprises:

sending, to a network device a third message requesting binding of the identifier to the first resource or the second resource; and receiving, from the network device, a fourth message indicating a result of the binding.

5. The method of claim 4, wherein the second message further comprises a first mapping relationship between a first stream identifier of the first data stream and the first QoS and a second mapping relationship between a second stream identifier of the second data stream and the second QoS, and wherein the method further comprises:

determining, based on the fourth message, that the identifier is successfully bound to the first resource or the second resource; and transmitting the first data stream and the second data stream to the first edge streaming media server.

6. The method of claim 1, further comprising:

receiving, from a second terminal device, a third message, comprising a second streaming media identifier and requesting second streaming media corresponding to the second streaming media identifier;

processing the second streaming media based on the SVC to obtain a third data stream and a fourth data stream, wherein the first data stream has a basic quality, and wherein a data stream formed by the second data stream and the first data stream has a higher quality than the basic quality;

determining a third QOS for each of the third data stream;

determining a fourth QoS of the fourth data stream; and transmitting the first data stream to the first edge streaming media server when an identifier of the second terminal device is unsuccessfully bound to a third resource corresponding to the third QoS or a fourth resource corresponding to the fourth QoS.

7. The method of claim 1, further comprising:

receiving, from the first edge streaming media server, a fifth message comprising a first priority of the first streaming media, a second priority of the first data stream, or a third priority of the second data stream; and further sending the second message based on the fifth message.

8. The method of claim 7, further comprising controlling the first edge streaming media server to break a connection through which the first edge streaming media server transmits a third data stream to the first terminal device.

9. The method of claim 8, wherein after breaking the connection, the method further comprises sending, to a second edge streaming media server, a sixth message comprising a stream identifier of the third data stream and instructing the second edge streaming media server to transmit the third data stream to the first terminal device.

10. A method implemented by a first edge streaming media server and comprising:

receiving, from a streaming media server, a second message comprising a first quality of service (QOS) of a first data stream, comprising a second QoS of a second data stream, and instructing the first edge streaming media server to transmit the first data stream to a terminal device using a first resource corresponding to the first QoS and to transmit the second data stream to the terminal device using a second resource corresponding to the second QoS, wherein the first data stream and the second data stream are based on scalable video coding (SVC) of streaming media, wherein the first resource and the second resource are different, and wherein each of the first resource and the second resource is a network slice resource comprising a radio sub-slice resource, a bearer sub-slice resource, or a core network sub-slice resource; and transmitting, to the terminal device based on the second message, the first data stream and the second data stream.

11. The method of claim 10, wherein the first resource or the second resource is a fifth-generation (5G) network slice resource.

12. The method of claim 10, wherein the second message further comprises a first stream identifier of the first data stream and a second stream identifier of the second data stream, and wherein before transmitting the first data stream and the second data stream, the method further comprises:

obtaining the first data stream and the second data stream from the streaming media server based on the second message; and establishing, using the first resource or the second resource, at least one connection for transmitting the first data stream and the second data stream.

13. The method of claim 12, wherein after transmitting the first data stream and the second data stream, the method further comprises:

obtaining a fifth message comprising a first priority of the streaming media, a second priority of the first data stream, or a third priority of the second data stream; and controlling the at least one connection based on the fifth message.

14. The method of claim 13, further comprising sending, to the streaming media server, the fifth message to instruct the streaming media server to control the at least one connection.

15. A streaming media server comprising:

a communication component configured to receive, from a first terminal device, a first message comprising a first streaming media identifier and requesting first streaming media corresponding to the first streaming media identifier; and a processing component configured to:

process the first streaming media based on scalable video coding SVC to obtain a first data stream and a second data stream;

determine a first quality of service (QOS) of the first data stream; and determine a second QoS of the second data stream, wherein the communication component is further configured to send, to a first edge streaming media server, a second message comprising the first QoS, comprising the second QoS, and instructing the first edge streaming media server to transmit the first data stream to the first terminal device using a first resource corresponding to the first QoS and to transmit the second data stream to the first terminal device using a second resource corresponding to the second QoS, wherein the first resource and the second resource are different, and wherein each of the first resource and the second resource is a network slice resource comprising a radio sub-slice resource, a bearer sub-slice resource, or a core network sub-slice resource.

16. The streaming media server of claim 15, wherein the first resource or the second resource is a fifth-generation (5G) network slice resource.

17. The streaming media server of claim 15, wherein the processing component is further configured to:

further determine the first QoS based on a preset mapping relationship preconfigured by a streaming media provider; or further determine the second QoS based on the preset mapping relationship.

18. The streaming media server of claim 15, wherein the first message further comprises an identifier of the first terminal device, and wherein before sending the second message, the communication component is further configured to:

send, to a network device a third message requesting binding of the identifier to the first resource or the second resource; and receive, from the network device, a fourth message indicating a result of the binding.

19. The streaming media server of claim 18, wherein the second message further comprises a first mapping relationship between a first stream identifier of the first data stream and the first QoS and a second mapping relationship between a second stream identifier of the second data stream and the second QoS, wherein the processing component is further configured to determine, based on the fourth message, that the identifier is successfully bound to the first resource or the second resource, and wherein the communication component is further configured to transmit the first data stream and the second data stream to the first edge streaming media server.

20. An edge streaming media server comprising:

a communication component configured to:

receive, from a streaming media server, a second message comprising a first quality of service (QOS) of a first data stream, comprising a second QoS of a second data stream, and instructing the edge streaming media server to transmit the first data stream to a terminal device using a first resource corresponding to the first QoS and to transmit the second data stream to the terminal device using a second resource corresponding to the second QoS, wherein the first data stream and the second data stream are based on scalable video coding (SVC) of streaming media, wherein the first resource and the second resource are different, and wherein each of the first resource and the second resource is a network slice resource comprising a radio sub-slice resource, a bearer sub-slice resource, or a core network sub-slice resource; and transmit, to the terminal device based on the second message, the first data stream and the second data stream.

* * * * *